United States Patent
Butcher et al.

(10) Patent No.: US 10,502,500 B2
(45) Date of Patent: Dec. 10, 2019

(54) METHOD OF GENERATING SUPPORT STRUCTURE OF TUBE COMPONENTS TO BECOME FUNCTIONAL FEATURES

(71) Applicant: United Technologies Corporation, Farmington, CT (US)

(72) Inventors: Evan Butcher, Manchester, CT (US); Wendell V. Twelves, Jr., Glastonbury, CT (US); Gary A. Schirtzinger, Glastonbury, CT (US); Joseph Ott, Enfield, CT (US); Lexia Kironn, Rocky Hill, CT (US)

(73) Assignee: United Technologies Corporation, Farmington, CT (US)

( * ) Notice: Subject to any disclaimer, the term of this patent is extended or adjusted under 35 U.S.C. 154(b) by 43 days.

(21) Appl. No.: 15/804,257

(22) Filed: Nov. 6, 2017

(65) Prior Publication Data

US 2018/0058771 A1    Mar. 1, 2018

Related U.S. Application Data

(62) Division of application No. 15/023,854, filed as application No. PCT/US2014/055980 on Sep. 17, 2014, now abandoned.

(Continued)

(51) Int. Cl.
*B29C 41/02* (2006.01)
*F28F 1/12* (2006.01)
(Continued)

(52) U.S. Cl.
CPC ............. *F28F 1/12* (2013.01); *B28B 1/001* (2013.01); *B29C 64/10* (2017.08); *B29C 64/106* (2017.08);
(Continued)

(58) Field of Classification Search
CPC ... B28B 1/001; B29C 64/00–40; B29D 23/00; B29D 23/001; B29L 2023/22; B33Y 10/00; B33Y 80/00
(Continued)

(56) References Cited

U.S. PATENT DOCUMENTS 4,012,902 A    3/1977  Schirmer
4,261,390 A    4/1981  Belofsky
(Continued)

FOREIGN PATENT DOCUMENTS

CN    20239227 U     8/2012
CN    103090123 A    5/2013
(Continued)

OTHER PUBLICATIONS

Communication Pursuant to Article 94(3) EPC from EP Serial No. 14846112.2, dated Apr. 26, 2018, 6 Pages.
(Continued)

*Primary Examiner* — Leo B Tentoni
(74) *Attorney, Agent, or Firm* — Kinney & Lange, P.A.

(57) ABSTRACT

A method includes building a tubular object by a layer-by-layer additive manufacturing process. A structure integrally connected to the tubular object for supporting a portion of the tubular object is formed during building of the tubular object. The structure provides vibration dampening, heat shielding, heat transfer, stiffening, energy absorption, or mounting after the tubular object is built.

14 Claims, 4 Drawing Sheets

Related U.S. Application Data

(60) Provisional application No. 61/881,216, filed on Sep. 23, 2013.

(51) Int. Cl.

| | | |
|---|---|---|
| *B29D 23/00* | (2006.01) |
| *F16L 59/08* | (2006.01) |
| *F16L 3/00* | (2006.01) |
| *F16L 9/00* | (2006.01) |
| *F16L 9/19* | (2006.01) |
| *F16L 9/21* | (2006.01) |
| *F16L 55/02* | (2006.01) |
| *F28F 1/40* | (2006.01) |
| *F28F 1/00* | (2006.01) |
| *B33Y 80/00* | (2015.01) |
| *B29C 64/40* | (2017.01) |
| *B29C 64/153* | (2017.01) |
| *B28B 1/00* | (2006.01) |
| *B29C 64/106* | (2017.01) |
| *B29C 64/118* | (2017.01) |
| *B29C 64/124* | (2017.01) |
| *B29C 64/112* | (2017.01) |
| *B29C 64/165* | (2017.01) |
| *B29C 64/10* | (2017.01) |
| *B33Y 10/00* | (2015.01) |
| *F16L 9/02* | (2006.01) |
| *B29L 23/00* | (2006.01) |

(52) U.S. Cl.
CPC .......... *B29C 64/112* (2017.08); *B29C 64/118* (2017.08); *B29C 64/124* (2017.08); *B29C 64/153* (2017.08); *B29C 64/165* (2017.08); *B29C 64/40* (2017.08); *B29D 23/00* (2013.01); *B33Y 10/00* (2014.12); *B33Y 80/00* (2014.12); *F16L 3/00* (2013.01); *F16L 9/006* (2013.01); *F16L 9/02* (2013.01); *F16L 9/19* (2013.01); *F16L 9/21* (2013.01); *F16L 55/02* (2013.01); *F16L 59/08* (2013.01); *F28F 1/00* (2013.01); *F28F 1/124* (2013.01); *F28F 1/40* (2013.01); *B29L 2023/22* (2013.01); *F28F 2225/04* (2013.01); *F28F 2255/00* (2013.01); *F28F 2265/10* (2013.01); *F28F 2265/30* (2013.01)

(58) Field of Classification Search
USPC .................. 264/113, 129, 308, 401, 497
See application file for complete search history.

(56) References Cited

U.S. PATENT DOCUMENTS

| | | | |
|---|---|---|---|
| 5,060,472 A | 10/1991 | Schirtzinger | |
| 5,900,207 A | 5/1999 | Danforth et al. | |
| 6,129,872 A | 10/2000 | Jang | |
| 6,364,986 B1 * | 4/2002 | Kieronski | B29C 64/165 264/401 X |
| 2002/0011047 A1 | 1/2002 | Obeshaw | |
| 2013/0001837 A1 * | 1/2013 | Gohler | B22F 3/1055 264/497 |

FOREIGN PATENT DOCUMENTS

| | | |
|---|---|---|
| EP | 2366928 A1 | 9/2011 |
| WO | WO2008107866 A1 | 9/2008 |
| WO | WO2012166546 A2 | 12/2012 |

OTHER PUBLICATIONS

Extended European Search Report for EP Application No. 14846112.2, dated May 31, 2017, 10 Pages.
International Search Report and Written Opinion for PCT Application No. PCT/US2014/055980, dated Dec. 22, 2014, 12 Pages.
Communication Pursuant to Article 94(3) EPC from EP Serial No. 14846112.2, dated Mar. 11, 2019, 4 Pages.

* cited by examiner

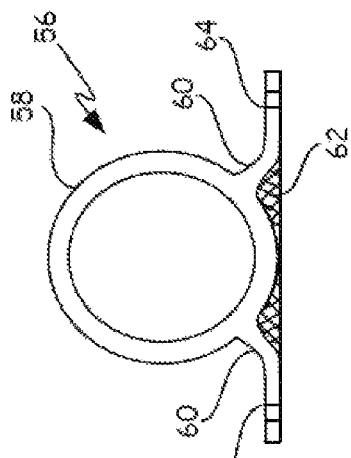
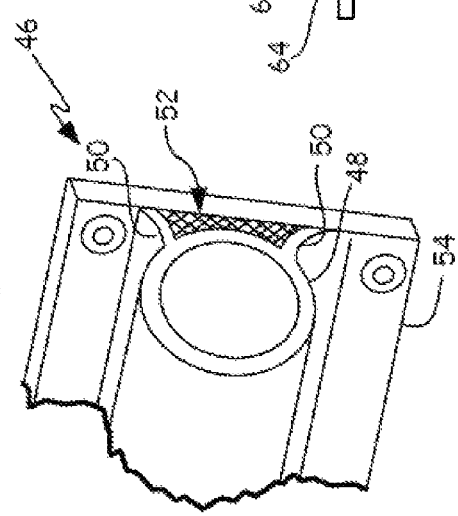
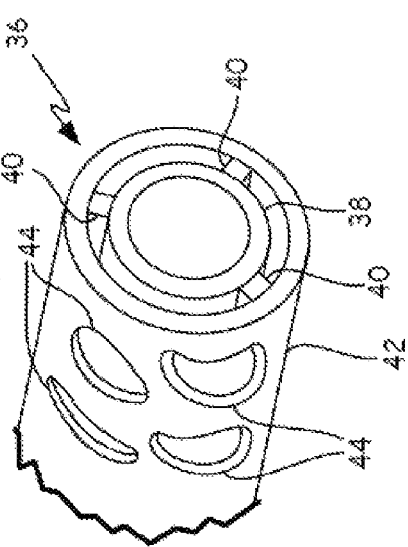
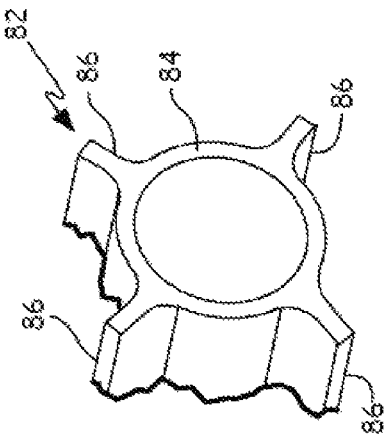
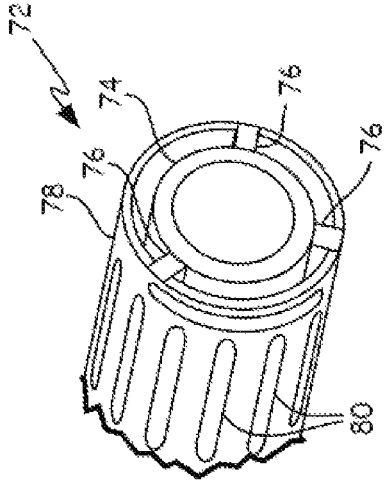
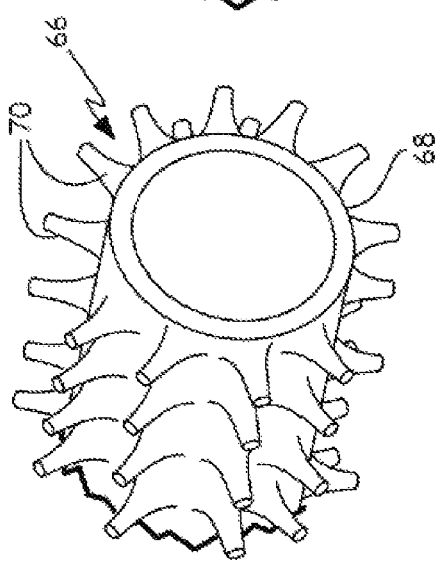

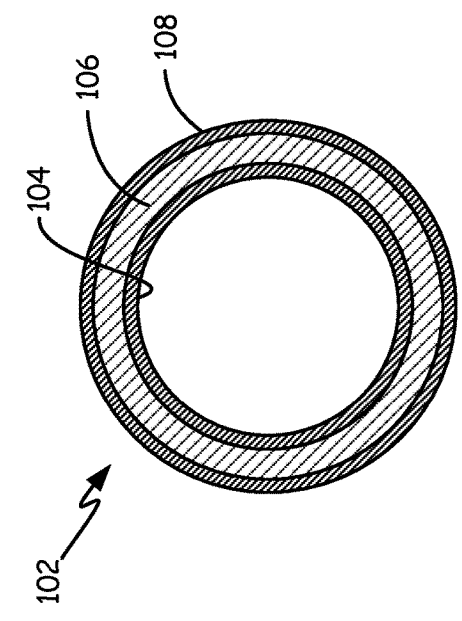
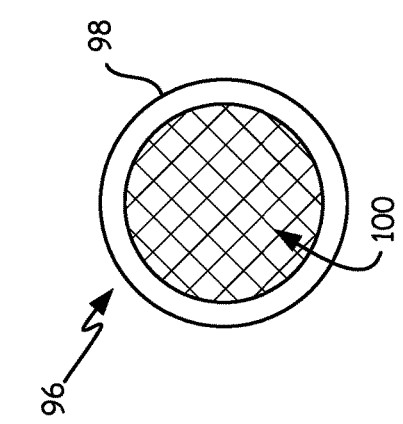
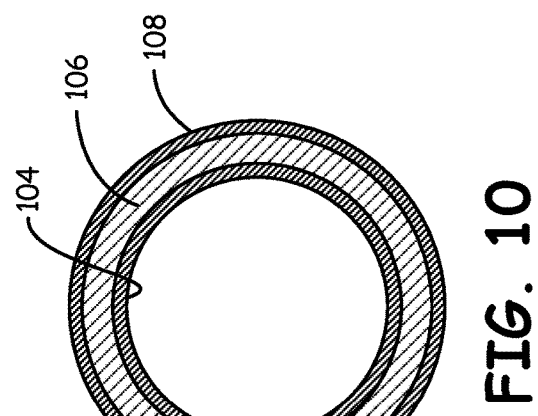
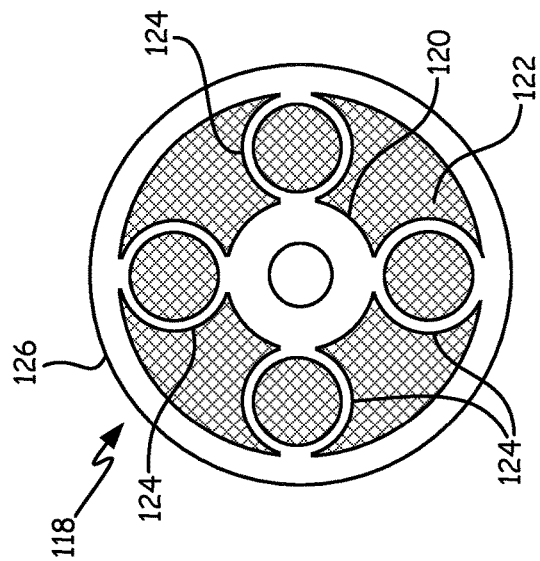
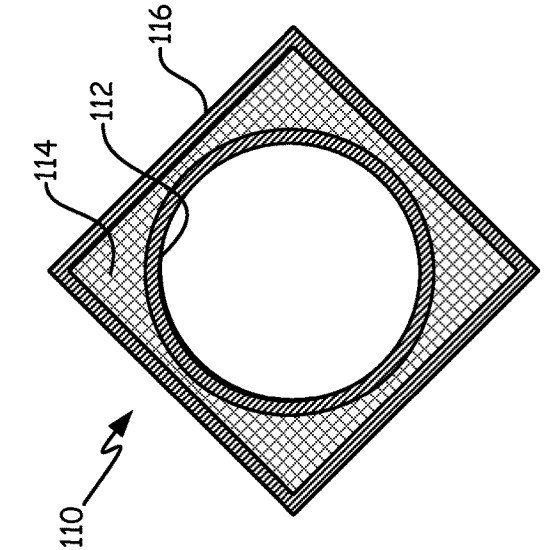

METHOD OF GENERATING SUPPORT STRUCTURE OF TUBE COMPONENTS TO BECOME FUNCTIONAL FEATURES

CROSS-REFERENCE TO RELATED APPLICATION(S)

This application is a divisional of now abandoned U.S. National Stage application Ser. No. 15/023,854 filed Mar. 22, 2016 for "METHOD OF GENERATING SUPPORT STRUCTURE OF TUBE COMPONENTS TO BECOME FUNCTIONAL FEATURES" by E. Butcher, W. Twelves, Jr., G. Schirtzinger, J. Ott and L. Kironn, which in turn claims the benefit of PCT International Application No. PCT/US2014/055980 filed Sep. 17, 2014 for "METHOD OF GENERATING SUPPORT STRUCTURE OF TUBE COMPONENTS TO BECOME FUNCTIONAL FEATURES" by E. Butcher, W. Twelves, Jr., G. Schirtzinger, J. Ott and L. Kironn, which in turn claims the benefit of U.S. Provisional Application No. 61/881,216 filed Sep. 23, 2013 for "METHOD OF GENERATING SUPPORT STRUCTURE OF TUBE COMPONENTS TO BECOME FUNCTIONAL FEATURES" by E. Butcher, W. Twelves, Jr., G. Schirtzinger, J. Ott and L. Kironn.

BACKGROUND

This invention relates generally to the field of additive manufacturing. In particular, the present disclosure relates to support structures used during additive manufacturing.

Additive manufacturing is an established but growing technology. In its broadest definition, additive manufacturing is any layerwise construction of articles from thin layers of feed material. Additive manufacturing may involve applying liquid, layer, or particle material to a workstage, then sintering, curing, melting, and/or cutting to create a layer. The process is repeated up to several thousand times to construct the desired finished component or article.

SUMMARY

A method includes building a tubular object by a layer-by-layer additive manufacturing process. A structure integrally connected to the tubular object for supporting a portion of the tubular object is formed during building of the tubular object. The structure provides vibration dampening, heat shielding, heat transfer, stiffening, energy absorption, or mounting after the tubular object is built.

An apparatus includes a tubular object built by layer-by-layer additive manufacturing. A structure including a heat-shield structure, mounting structure, honeycomb structure, fin structure, matrix structure, lattice structure, rib structure, filter structure, bushing structure, or slot is integrally formed to the tubular object. The structure is positioned to act as a support structure during building of the tubular object by layer-by-layer additive manufacturing.

A method includes designing a component having a tubular body and a structure that performs at least one of vibration dampening, heat shielding, heat transfer, stiffening, energy absorption, or mounting. The structure is positioned with respect to the tubular body so that the structure will act as a support to the component during layer-by-layer additive manufacturing of the component. Digital files are created that define the component on a layer-by-layer basis. The component is then produced by layer-by-layer additive manufacturing using the digital files.

BRIEF DESCRIPTION OF THE DRAWINGS

FIG. 2 is a simplified perspective view of a tubular object with a vibration control structure.

FIG. 3 is a simplified perspective view of a tubular object with mounting tabs.

FIG. 4 is a simplified sectional view of a tubular object with mounting tabs.

FIG. 5 is a simplified perspective view of a tubular object with heat-transferring fins.

FIG. 6 is a simplified perspective view of a tubular object with a stand-off heat shield.

FIG. 7 is a simplified perspective view of a tubular object with stiffening ribs.

FIG. 8 is a simplified sectional view of a tubular object with ribs.

FIG. 9 is a simplified sectional view of a tubular object with a filter.

FIG. 10 is a simplified sectional view of a tubular object with a compliant matrix.

FIG. 11 is a simplified sectional view of a tubular object with a honeycomb support structure.

FIG. 12 is a simplified sectional view of a tubular object with spring elements.

DETAILED DESCRIPTION

Figure 1A:
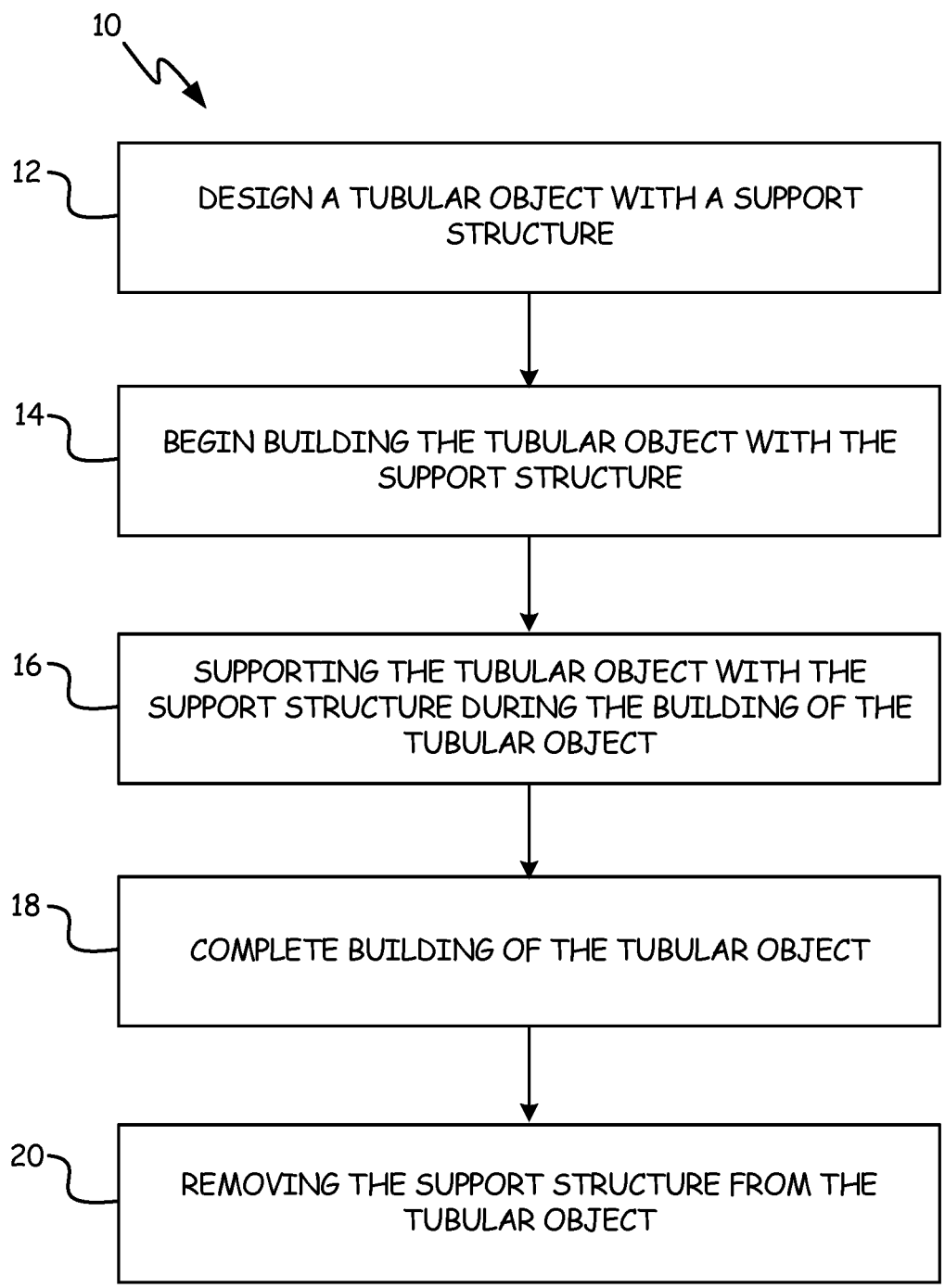
FIG. 1A is a flow-diagram representing a prior art additive manufacturing process.

FIG. 1A is a flow-diagram representing prior art additive manufacturing process 10. Prior art additive manufacturing process 10 includes steps 12-20. Step 12 includes designing a tubular object with a support structure. Step 14 includes beginning to build the tubular object with the support structure. Step 16 includes supporting the tubular object with the support structure during the building of the tubular object. Step 18 includes completing building of the tubular object. Step 20 includes removing the support structure from the tubular object.

If a designer wants to build a tubular object vertically using an additive manufacturing process, the object will build quite nicely. If the tubular object is a simple short, straight tubular object, a vertical build orientation without support structures will suffice because as the tubular object is built layer-by-layer, the previous layers support the new layers being deposited directly vertical to the previous layers. However, the geometry and the build orientation are not always favorable to the fabrication of a cross section of the tube in a vertical orientation. As soon as the overhead features of the tubular object exceed a build limit angle of approximately 45 degrees off vertical, dendrites and stalactites can form on the tubular object and ruin the build. For example, for selective laser sintering, when the laser penetrates the melt pool of the current layer and there is not a previously formed subjacent layer of material supporting the current layer, the laser penetrates the current layer without a backstop. The laser penetrates the current layer and causes material of the current layer to protrude downward from the current layer causing the formation of stalactites and dendrites.

Examples of tubular objects requiring over-head features exceeding the build limit angle off-vertical build direction can include tubes following a serpentine path, tubes having to fit in an envelope, tubes wrapping around a bearing housing, or tubes wrapping around other tubes.

In these instances, support structures are needed to support the tubular object during the building to prevent portions of the tube from drooping or sagging, and to prevent the formation of stalactites and dendrites. Support structures used during the additive manufacturing build of the tube can be formed either inside or outside of the tube. The support structures help support the weight of portions of the tube as the tube is being built.

Figure 1B:
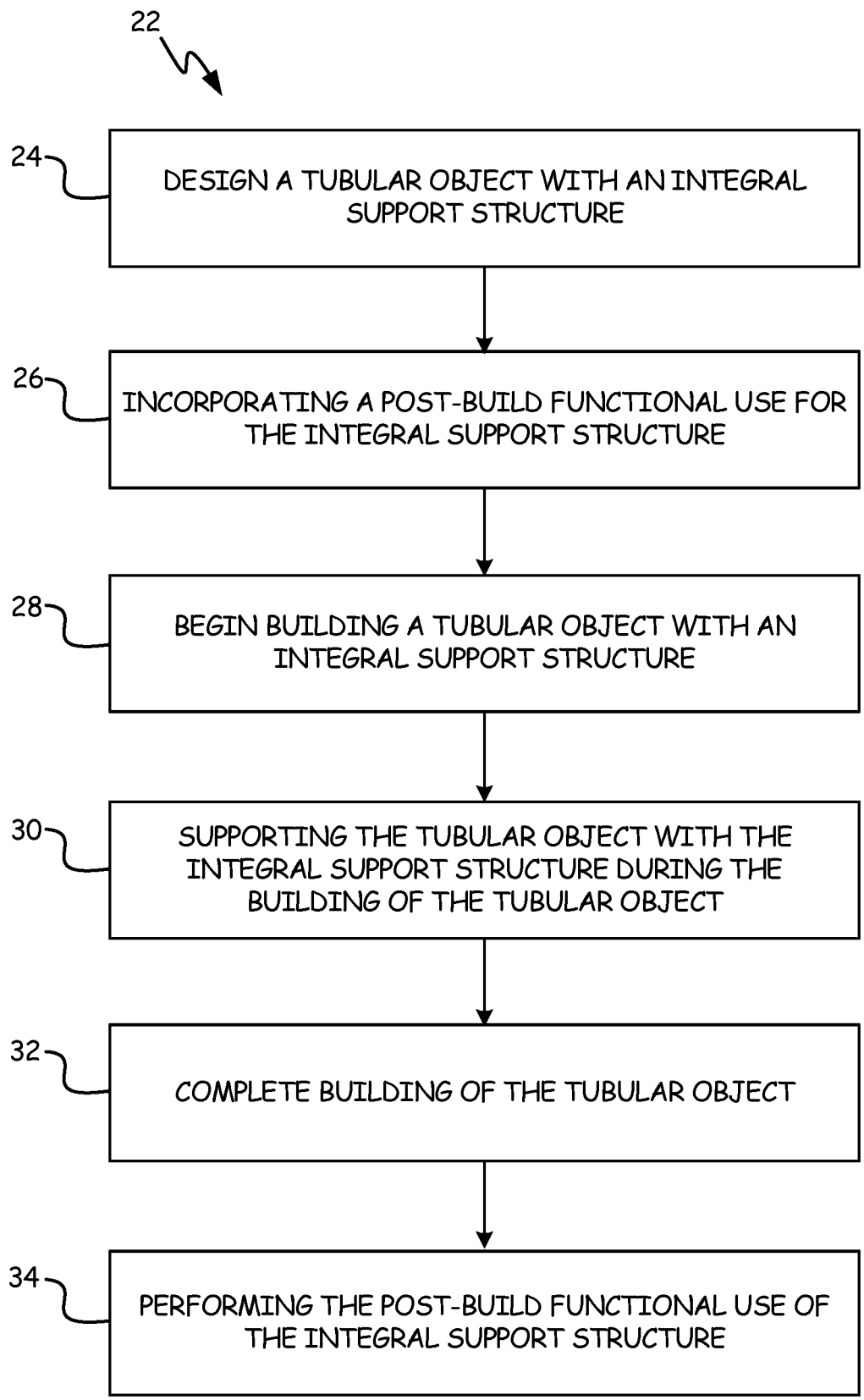
FIG. 1B is a flow-diagram representing an additive manufacturing process.

FIG. 1B is a flow-diagram representing additive manufacturing process 22. Additive manufacturing process 22 includes steps 24-34. Step 24 includes designing a tubular object with an integral support structure. Step 26 includes incorporating a post-build functional use for the integral support structure. Step 28 includes beginning to build the tubular object with the integral support structure. Step 30 includes supporting the tubular object with the integral support structure during the building of the tubular object. Step 32 includes completing building of the tubular object. Step 34 includes performing the post-build functional use of the integral support structure.

Typically, a support structure used during prior art additive manufacturing process 10 becomes waste parent material that is inherent in an additive manufacturing process after an object is built. Additive manufacturing process 22 allows for the integral support structure to be retained with the tubular structure both during the build, and after the build of the tubular object to perform a post-build functional use. Functional uses that are added to tubes to handle vibration frequencies, to control the heat transfer of fluids within tubes, or to mount tubes are often expensive, add weight, and increase the part count of an overall assembly. Additive manufacturing process 22 can design these functional uses as part of the integral support structure to become a functional piece of the tubular object. Functional uses of the integral support structure may include vibration dampening, heat shielding, heat transfer, stiffening, energy absorption, or mounting. The integral support structure may include a heat-shield structure, mounting structure, honeycomb structure, fin structure, matrix structure, lattice structure, rib structure, filter structure, bushing structure, or slot.

The structural connection between a tubular object and a support structure is much stronger with additive manufacturing process 22 as compared to traditional non-additive manufacturing processes of attachment for structural supports. Traditional non-additive manufacturing processes can include welding. With welding, because the two pieces of material are different, the connection between the two is not as strong or reliable as if the two pieces were integrally formed as one part as with additive manufacturing process 22. Traditional non-additive manufacturing processes can also include casting, extruding, and machining.

With additive manufacturing process 22, complex geometries are achievable which may not be economically feasible with traditional non-additive manufacturing processes. Additive manufacturing process 22 eliminates the need to employ commonly expensive traditional non-additive manufacturing processes of attaching structural support members after the initial build of the tubular object. Additionally, employing traditional non-additive manufacturing processes to create complex geometries can become very expensive. Three dimensional structural matrices, made possible by additive manufacturing, enable fewer raw materials to be used therefore decreasing the weight, while still maintaining a high degree of structural integrity within the part.

FIG. 2 is a simplified perspective view of tubular object 36 with vibration control structure 42. Tubular object 36 includes tube 38 and truss structures 40 that are integrally formed to tube 38. Truss structures 40 integrally connect tube 38 to vibration control structure 42. Vibration control structure 42 surrounds tube 38. Vibration control structure 42 includes voids 44 interspersed along the length of vibration control structure 42.

Vibration control structure 42 raises the natural frequency of tube 38 by increasing the moment of inertia of tube 38. The size, shape, and location of voids 44 can be designed specifically to the desired vibration response of vibration control structure 42. Integrally forming vibration control structure 42 to tube 38 during additive manufacturing process 22 provides a higher degree of customization and design freedom than traditional non-additive manufacturing processes allow.

During the building of tubular object 36, truss structures 40 and vibration control structure 42 provide structural support for tube object 38 by helping to brace tube 38. As tubular object 36 is formed layer-by-layer, truss structures 40 and vibration control structure 42 help to keep tubular object 36 within geometric build constraints of additive manufacturing process 22.

FIG. 3 is a simplified perspective view of tubular object 46 with mounting tabs 54. Tubular object 46 includes tube 48 which is integrally connected to connections 50. Honeycomb support structure 52 is positioned adjacent to tube 48 and to connections 50. Base plate 54 is connected to tube 48 by connections 50. Base plate 54 is integrally formed to connections 50 and connections 50 are integrally formed to tube 48. Honeycomb matrix structure 52 is integrally formed to tube 48 and to connections 50.

The integral relationship between tube 48, connections 50, and base plate 54 prevents the need to attach non-integral support structures to tube 48 after tube 48 is built. Non-integral support structures attached to tube 48 after tube 48 is built can create weak connection points where the non-integral support structure is attached to tube 48. Integrally connecting base plate 54 and tube 48 provides connections 50 that is able to withstand a greater amount of stress and strain than a non-integral support structure attached to tube 48 would be able to withstand. Non-integral connection means can fail when a tubular object is placed into an in-use environment within a gas turbine engine. An example of a non-integral connection means includes welding.

FIG. 4 is a simplified sectional view of tubular object 56 with mounting tabs 64. Tubular object 56 includes tube 58 which is connected to connections 60. Honeycomb support structure 62 is positioned adjacent to tube 58 and to connections 60. Mounting tabs 64 are integrally connected to tube 58 by connections 60. Mounting tabs 64 are integrally formed to connections 60, and connections 60 are integrally formed to tube 58. Honeycomb support structure 62 is integrally formed to tube 58 and to connections 60.

Honeycomb support structure 64 provides structural support between tube 58 and mounting tabs 64. The porous nature of honeycomb support structure 62 provides for a lighter weight support feature for tube 60 as opposed to a completely solid support structure.

FIG. 5 is a simplified perspective view of tubular object 66 with fins 70. Tubular object 66 includes fins 70. Fins 70 are integrally connected to tube 68. Fins 70 perform a heat-transferring function by transferring thermal energy away from tube 68.

The size, shape, surface-area, and location of fins 70 can be designed specifically to a desired thermal management functionality of fins 70. Integrally forming fins 70 to tube 68 during additive manufacturing process 22 provides a higher degree of customization and design freedom than traditional non-additive manufacturing processes allow.

FIG. 6 is a simplified perspective view of tubular object 72 with a stand-off heat shield 78. Tubular object 72 includes tube 74 and truss structures 76 integrally formed to tube 74. Truss structures 76 integrally connect tube 74 to stand-off heat shield 78. Stand-off heat shield 78 surrounds tube 74. Stand-off heat shield 78 includes slots 80 interspersed along the length of stand-off heat shield 78.

The size, shape, surface-area, and location of slots 80 can be designed specifically to a desired thermal gradient control of stand-off heat shield 78. Integrally forming stand-off heat shield 78 to tube 74 during additive manufacturing process 22 provides a higher degree of customization and design freedom than traditional non-additive manufacturing processes allow.

FIG. 7 is a simplified perspective view of tubular object 82 with ribs 86. Tubular object 82 includes tube 84 and ribs 86 integrally formed to tube 84 during additive manufacturing process 22. Ribs 86 provide a stiffening function to tube 84.

When tubular object 86 is being used as a strut, tubular object 82 can experience buckling. High compression loads placed on tubular object 82 can cause tubular object 82 to fail and buckle. Ribs 86 stabilize tubular object 82 against buckling under high compression loads.

The present disclosure provides ribs 86 integrally formed to tube 84 during additive manufacturing process 22. Integrally forming ribs 86 and tube 84 together allows tubular object 82 to withstand greater amounts of compression loads. Attaching non-integral support structures to a tubular object creates additional time and cost into the manufacturing process. Additionally, the connection between a non-integral support structure and a tubular object can contain inherent deficiencies and weaknesses caused by the non-monolithic nature of the non-integral connection.

FIG. 8 is a simplified sectional view of tubular object 988 with ribs 92. Tubular object 88 includes tube 90 and ribs 92. During additive manufacturing process 22, ribs 92 provide structural support to tube 94. After tubular object 88 is built with ribs 92 integrally formed within tube 90, ribs 92 additionally provide structural support to tubular object 88 when tubular object 88 is being used in a post-build functional state. Channels 94 are disposed in between ribs 92. Closing out the overhead structure between the ribs at an angle that is less than the build limit angle eliminates the need for additional support structures. This design strategy enables open flow passages in curved and otherwise non-accessible passages from which support structure cannot be removed.

Integrally forming ribs 92 to tube 90 during additive manufacturing process 22 enables the length-wise shape of tubular object 88 to include non-linear pathways. With traditional non-additive manufacturing processes, tubular objects following linear pathways could be machined to include ribs. However, when tubular object 88 follows a non-linear or serpentine path, ribs 92 are not able to be machined or extruded.

Additive manufacturing process 22 enables tube 90 to retain its flow characteristics after the addition of ribs 92. The spaces between ribs 92 allow for fluid to flow through tube 90. Additionally, ribs 92 may include perforations with small diameter holes to allow fluid to pass in between each of ribs 92 and to maintain pressure equalization so ribs 92 do not get a change in pressure across each of ribs 92.

FIG. 9 is a simplified sectional view of tubular object 96 with filter 100. Tubular object 96 includes tube 98 and filter 100. Filter 100 is integrally connected to tube 98. Filter 100 can be designed to filter out different sizes of particulates depending on the fluid and the aircraft engine system tubular object 98 is a part of. Filter 100 doubles as a support structure for tube 98. Filter 100, once full with particulate matter, can either be reversed flushed to remove the particulate matter, or tubular object 96 containing filter 100 can be disposed of and replaced. The types of particulates to be filtered using filter 100 may include metal, carbon, or varnish particles.

FIG. 10 is a simplified sectional view of tubular object 102 with a compliant matrix 106. Tubular object 102 includes tube 104 which is surrounded by compliant matrix 106. Compliant matrix 106 is integrally connected to tube 104. Skin 108 surrounds and is integrally connected to compliant matrix 106.

Skin 108 functions as a heat shield to shield tube 104 from thermal energy created during in-use conditions. Compliant matrix 106 is compliant and flexible so that compliant matrix 106 and tube 104 do not become overstressed due to thermal gradients or differentials. Compliant matrix 108 may include a honeycomb or truss-core structure. Besides providing a heat shielding function, the combination of compliant matrix 106 and skin 108 increases the moment of inertia of tubular object 102 and stabilizes tube 104 against buckling. The size and internal structure of compliant matrix 106 can be designed to perform specific thermal management based upon the in-use environment of tubular object 102.

FIG. 11 is a simplified sectional view of tubular object 110 with honeycomb support structure 114. Tubular object 110 includes tube 112 and honeycomb support structure 114. Honeycomb support structure 114 is integrally formed to tube 116 during additive manufacturing process 22. Thin wall 116 surrounds and is integrally connected to honeycomb support structure 114. Honeycomb support structure 114 provides a stiffening function for tubular object 110.

If tube 112 is being used to transport fluid, tube 112 can experience hoop stress. Honeycomb matrix structure 114 and thin wall 114 provide structural support to absorb the hoop stress, among other stresses, experienced by tube 112 during fluid transport. Additionally, honeycomb support structure 114 and thin wall 114 generally provide structural support to tubular object 110.

FIG. 12 is a simplified sectional view of tubular object 118 with spring elements 124. Tubular object 118 includes tube 120 and honeycomb support structure 122. Honeycomb support structure 122 is integrally formed to tube 120 during additive manufacturing process 22. Spring elements 124 are positioned radially adjacent to tube 120. Honeycomb support structure 122 is also formed inside of and integrally connected to spring elements 124. Thin wall 126 is tubular in shape, and surrounds tube 120, honeycomb support structure 122, and spring elements 124.

The arrangement of tube 120, honeycomb support structure 122, spring elements 124, and thin wall 126 performs an energy absorbing bushing function. Spring elements 124 act as crumple zones and are enabled to absorb a load spike without tube 120 suffering a catastrophic failure. Additionally, during additive manufacturing process 22, each of honeycomb support structure 122, spring elements 124, and thin wall 126 provide overhead support for building tubular object 118.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method comprising:
   building a tubular object designed for and built by a layer-by-layer additive manufacturing process;
   forming, while building the tubular object, a structure integrally connected to the tubular object for supporting a portion of the tubular object having a build direction that exceeds a build limit angle of the layer-by-layer additive manufacturing process during building of the tubular object with the layer-by-layer additive manufacturing process, and wherein the structure provides vibration dampening, heat shielding, heat transfer, stiffening, energy absorption, or mounting after the tubular object is built.

2. The method of claim 1, wherein a portion of the structure comprises a heat-shield structure, mounting structure, honeycomb structure, fin structure, matrix structure, lattice structure, rib structure, filter structure, bushing structure, or slot.

3. The method of claim 1, wherein the tubular object includes at least one channel therein extending for the length of the tubular object, and the at least one channel is configured to allow transport of a fluid through the tubular object.

4. The method of claim 3, wherein the structure is disposed within the tubular object and the structure is configured to allow transport of the fluid through the tubular object.

5. The method of claim 3, wherein the fluid comprises oil, fuel, gas, or air.

6. The method of claim 1, wherein the tubular object comprises a tube designed for use in a gas turbine engine.

7. A method comprising:
   designing a component having a tubular body and a structure that performs at least one of vibration dampening, heat shielding, heat transfer, stiffening, energy absorption, or mounting, wherein the structure is positioned with respect to the tubular body so that the structure will act as a support to the component during layer-by-layer additive manufacturing of the component;
   creating digital files defining the component on a layer-by-layer basis; and
   producing the component by layer-by-layer additive manufacturing using the digital files, wherein the structure supports the component during the producing of the tubular body, wherein a build direction of a portion of the tubular body exceeds a build limit angle of the layer-by-layer additive manufacturing process.

8. The method of claim 6, wherein a portion of the structure comprises a heat-shield structure, mounting structure, honeycomb structure, fin structure, matrix structure, lattice structure, rib structure, filter structure, bushing structure, or slot.

9. The method of claim 7, wherein the tubular object includes at least one channel therein extending for the length of the tubular object, and the at least one channel is configured to allow transport of a fluid through the tubular object.

10. The method of claim 9, wherein the structure is disposed within the tubular object and the structure is configured to allow transport of the fluid through the tubular object.

11. The method of claim 9, wherein the fluid comprises oil, fuel, gas, or air.

12. The method of claim 7, wherein the tubular object comprises a tube designed for use in a gas turbine engine.

13. The method of claim 1, wherein the build limit angle of the layer-by-layer additive manufacturing process comprises approximately 45 degrees off vertical.

14. The method of claim 7, wherein the build limit angle of the layer-by-layer additive manufacturing process comprises approximately 45 degrees off vertical.

* * * * *